July 31, 1923.
1,463,165
A. G. M. JACK
FLEXIBLE SUPPORTING MEANS SUITABLE FOR USE IN SUSPENSION TRANSPORTER
ARRANGEMENTS AND FOR OTHER PURPOSES
Original Filed Dec. 8, 1919
3 Sheets-Sheet 1
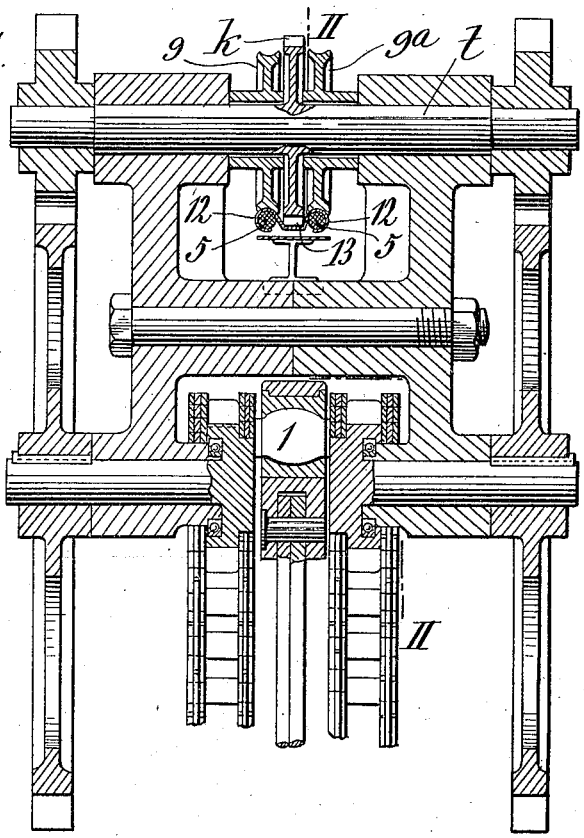
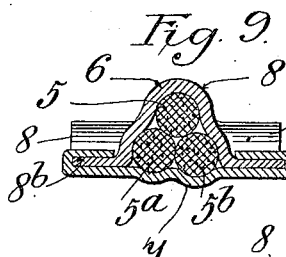
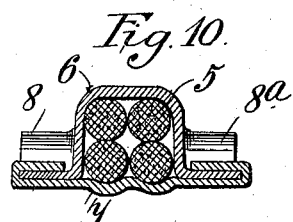
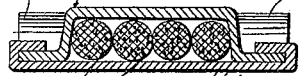
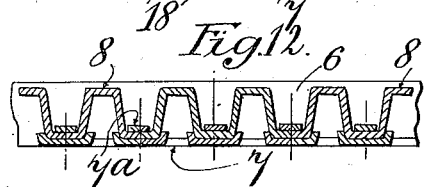

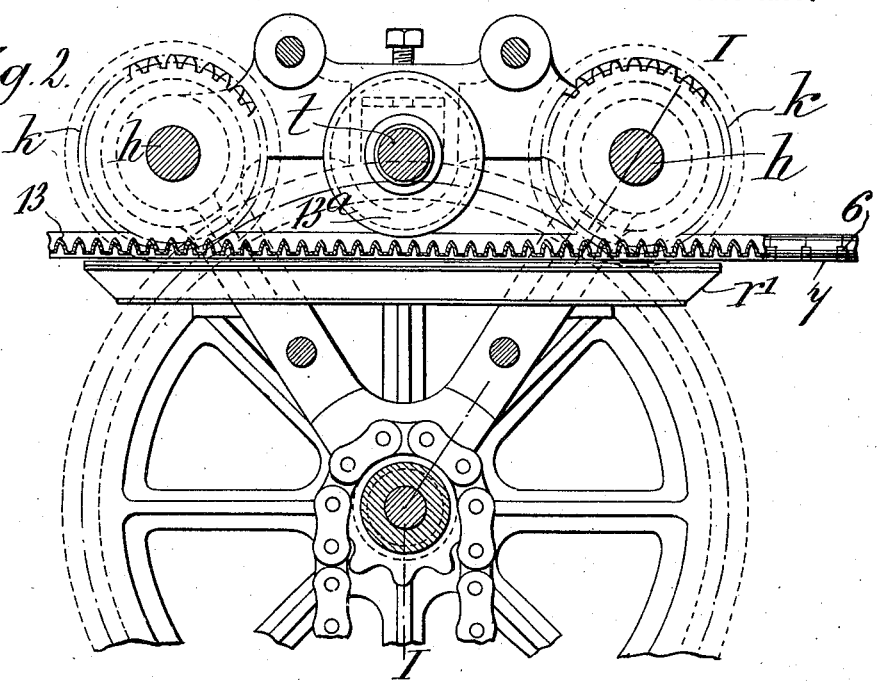
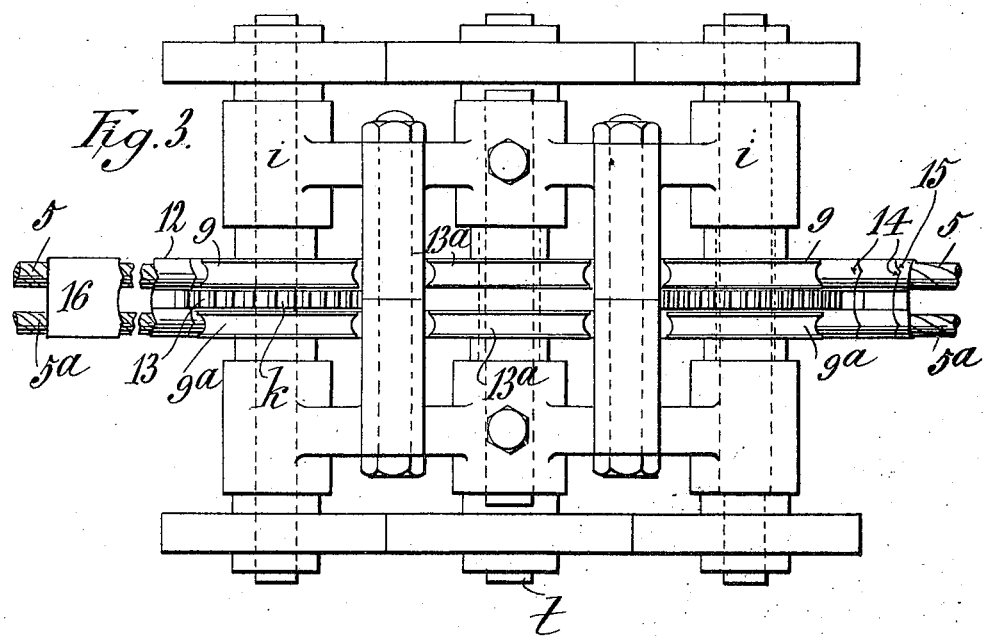

July 31, 1923.  1,463,165
A. G. M. JACK
FLEXIBLE SUPPORTING MEANS SUITABLE FOR USE IN SUSPENSION TRANSPORTER ARRANGEMENTS AND FOR OTHER PURPOSES
Original Filed Dec. 8, 1919   3 Sheets-Sheet 3
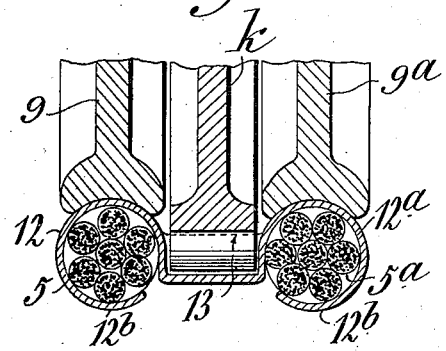
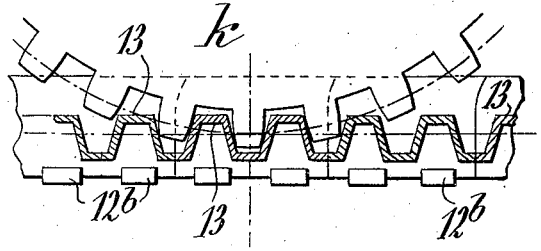
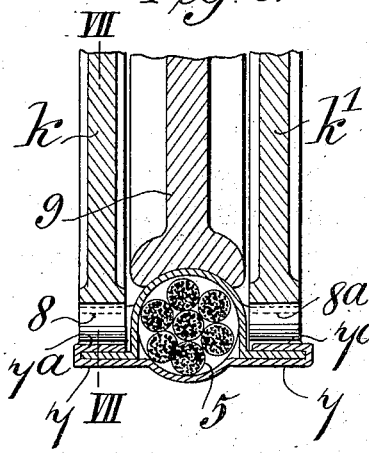
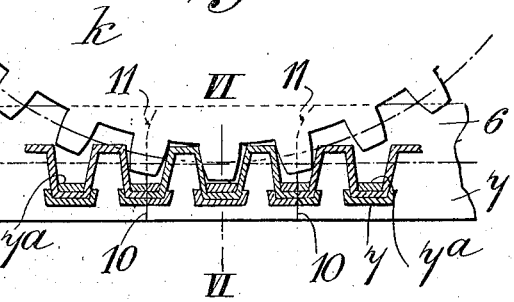
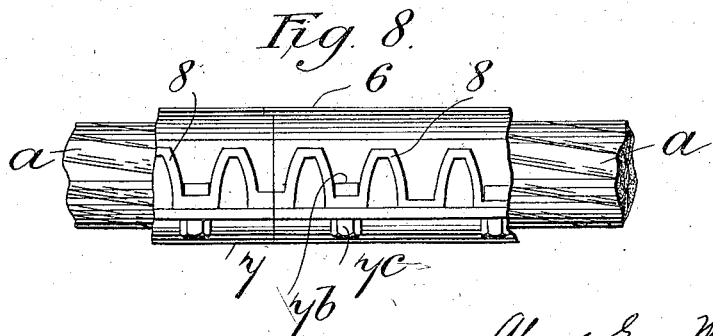

Patented July 31, 1923.

1,463,165

UNITED STATES PATENT OFFICE.

ALEXANDER GEORGE MACKENZIE JACK, OF SHEFFIELD, ENGLAND.

FLEXIBLE SUPPORTING MEANS SUITABLE FOR USE IN SUSPENSION TRANSPORTER ARRANGEMENTS AND FOR OTHER PURPOSES.

Original application filed December 8, 1919, Serial No. 343,439. Patent No. 1,417,070, dated May 23, 1922. Divided and this application filed May 1, 1922. Serial No. 557,790.

*To all whom it may concern:*

Be it known that I, ALEXANDER GEORGE MACKENZIE JACK, a subject of the King of Great Britain and Ireland, residing at Brincliffe, Sheffield, in the county of York, England, have invented Improvements in or Relating to Flexible Supporting Means Suitable for Use in Suspension Transporter Arrangements and for Other Purposes, of which the following is a specification.

In the specification of another application for Letters Patent Serial No. 343439 filed December 8th, 1919, now Patent 1,417,070, issued May 23, 1922, and of which the present application is a division, I have described an invention relating to a suspension transporter arrangement wherein a platform or equivalent device (hereinafter called a platform) is supported from a flexible overhead suspension member or members, through supporting and traversing means comprising a controller provided with mechanism adapted to gear with and be operated by the suspension member or members when the controller is moved from one end thereof to the other, and compensating lowering and raising mechanism under the control of the controller mechanism and from which the platform is suspended, the construction and arrangement of the controller being such that although it will, during its travel along the suspension member or members rise and fall to an extent depending upon the versed sine of the catenary curve of such suspension member or members, the height of the point or points of support for the platform or equivalent will remain constant, or nearly constant, so that the platform will travel in a nearly horizontal or slightly waved path.

To enable this result to be attained, the point or each point of connection of the supporting chain or each supporting chain, carrying the platform, to the lowering and raising mechanism operated by the controller, is so arranged and operated that it will raise the platform when the controller is descending one portion of the flexible suspension means and will lower the platform when the controller is ascending the other curved portion of the said flexible suspension means, with the result that, in relation to a horizontal plane, the said point of connection will remain nearly level and at the same height during the whole journey of the traveller along the catenary curve. The flexible suspension means may be provided with two controllers, each having a point of suspension for a supporting chain as described. Also, in some cases the overhead flexible suspension means may comprise two or more members arranged side by side and at a suitable distance apart and each provided with one or two controllers.

Now the present application, which is a division of my said former application for Letters Patent, relates more particularly to the flexible supporting means used in such suspension transporter arrangements but which is also suitable for other uses where flexible supporting means, consisting of a flexible trackway, is desired and where it is desired to provide flexible supporting means that shall be lighter in weight and more effective in action than an ordinary link chain.

Therefore, according to the present invention, in order that to provide flexible suspension means suitable for the purpose set forth but of less weight than a link chain or chains so as to admit of suspension transporter arrangements of the kind referred to, or of other kinds, being more readily and economically constructed and worked, of greater length or span, say of the order of magnitude of one thousand feet and upwards, than can be done when one or more link chains are used, the flexible suspension means used may advantageously comprise one or more lengths of flexible metal provided with projections or teeth adapted to engage with and operate for instance gear wheels on the controller of a suspension transporter arrangement of the kind referred to or of other kind, when the controller is moved from one end of the said flexible suspension means to the other end thereof. Such flexible suspension means can be variously constructed. Thus, it may advantageously comprise one or more strong steel ropes or cables (hereinafter called ropes) of circular or substantially circular section, provided along its length with teeth adapted to gear with the teeth of the gear wheels on the controller or other device and rotate such wheels when the controller or other device is traversed over them. Conveniently, the teeth may be formed in one or more longitudinal sets on a large number of metal sleeves arranged end to end, and adapted to be suitably fixed to the wire rope or ropes.

With a view to preventing relatively endways movement between the ropes and sleeves, due to temperature changes, these parts may advantageously be formed of metal having the same co-efficient of expansion. Also, with a view to reducing weight, the teeth may be made hollow.

In flexible suspension means constructed as just described, it will be understood that as the wire rope or ropes is or are covered by the sleeves, it or they will not be subjected to friction with the controller and will therefore have a long life. Also, as the rope or ropes will become coated with oily or greasy matter from the controller, it or they will not be subject to oxidation. Also, the sleeves can, when necessary, be easily renewed.

Or, in lieu of using one or more wire ropes of round or substantially round shape in section, as the flexible suspension means for carrying the rack or racks, a length of flat wire rope may be used for carrying the rack or racks.

In order that the construction and application of flexible supporting means according to the present invention may be readily understood, it will now be further described in connection with a suspension transporter arrangement of the kind described in my said former application for Letters Patent and with the aid of the accompanying illustrative drawings.

In these drawings, Fig. 1 is a section on the line I—I of Fig. 2, Fig. 2 is a section on the line II—II of Fig. 1 and Fig. 3 is a plan, showing a controller with compensating lowering and raising mechanism of the kind described and shown in my said former specification embodying flexible supporting means comprising two wire ropes with sleeves and a single longitudinal set of teeth forming a single flexible rack. Figs. 4 and 5 show the two ropes and associated parts of the flexible supporting means in cross section and longitudinal section respectively and to a larger scale than Figs. 1, 2 and 3.

Fig. 6 is a cross section on the line VI—VI of Fig. 7 and Fig. 7 is a cross section on the line VII—VII of Fig. 6, showing a modified arrangement in which the flexible supporting means comprises a wire rope with sleeves and two longitudinal sets of teeth forming two flexible racks. Fig. 8 shows in side view, a modification of the arrangement shown in Figs. 6 and 7. Figs. 9 and 10 show in cross section modified constructions of flexible means. Figs. 11 and 12 show in cross section and sectional side elevation, a further modified construction of such supporting means.

Figs. 1 to 5 inclusive, show a suspension transporter arrangement of the kind herein referred to having flexible supporting means comprising two wire ropes 5 $5^a$, arranged side by side. In this example, double sleeves 12, $12^a$ are adapted to be fixed to the two ropes and carry between them a row of teeth 13, each double sleeve with intermediate teeth being formed out of a piece of sheet metal which is pressed or stamped between dies to form the row of teeth 13 and curved side portions to form the sleeves 12, $12^a$ which, after being placed on the ropes, are bent around the same so as to become tightly clamped thereto (see Fig. 4). To facilitate the bending of the edge portions of the piece of metal around the ropes, such edge portions are slotted to form fingers $12^b$ that can be readily bent to the shape shown. In this case each of the shafts $h$ of the controller has fixed to it a toothed wheel $k$ to gear with the row of teeth 13 carried by the successive double sleeves 12, $12^a$ and is provided with two grooved supporting wheels 9, $9^a$ arranged to run on the convex upper portions of the successive double sleeves 12, $12^a$. The vertical adjustable intermediate shaft $t$ of the controller (Figs. 2 and 3) is also provided with a pair of similar grooved wheels $13^a$ arranged to run upon and bear against the successive double sleeves 12, $12^a$ so as to assist in relieving the toothed wheels $k$ of the weight of the controller and its load.

Figs. 6 and 7 show a modified arrangement wherein the flexible supporting means, instead of consisting of two sleeve connected ropes as hereinbefore described with reference to Figs. 1 to 5 inclusive, comprises a single steel wire rope 5 of circular section provided along its length with a number of metal sleeves, arranged end to end and adapted to be securely fixed to the rope, the sleeves being provided along their length with teeth adapted to gear with the teeth of gear wheels on the controller. In the example shown, each sleeve is divided horizontally into two parts 6 and 7 formed of sheet metal. The upper part 6 is bent or shaped, as between dies, to form a central concave portion fitting over the rope and two side portions, each of which is shaped to form a row of teeth 8 or $8^a$. The central portion of the lower part 7 of each sleeve is also bent or shaped, as shown, to form a central portion fitting the underside of the rope, and two side portions that are slotted to form rows of fingers $7^a$ that are bent over the side portions of the upper part of the sleeve and fit into the recesses between the teeth 8, $8^a$ so as tightly to clamp the said side portions of the upper part of the sleeve to the lower part thereof at these points, and both parts to the rope.

In this case each shaft $h$ of a controller such as shown in Figs. 1, 2 and 3, will have fixed to it two toothed wheels $k$ $k^1$ (see Fig. 6) to gear with the two rows of teeth 8, $8^a$ and will also carry an intermediate grooved wheel 9 arranged to run on the upper parts 6 of the sleeves 6—7 so as to relieve the toothed wheels $k$, $k^1$ of the weight of the controller and its load. The joints 10 between adjacent lower portions 7 of the sleeves may coincide with the joints 11 between the adjacent upper portion 6 of the sleeves, as shown in Fig. 7; or the two sets of joints may be staggered.

The joints between the adjacent upper portions 6 of divided sleeves such as hereinbefore described, may be arranged to be slightly open so as to permit the sleeves to move angularly with reference to one another to compensate for the varying curvature or movement of the flexible rack or racks as a whole when the controller with its load is being moved along such rack.

Fig. 8 shows sleeves similar to those shown in Figs. 6 and 7 but each made in two parts of cast metal connected together by bolts $7^b$ and nuts $7^c$.

To facilitate quick and accurate assembly of the sleeves on the rope or ropes with the teeth in the longitudinal set thereof, or each longitudinal set thereof, in a row or rows, so that they will gear in an efficient manner with the gear wheel $k$ or gear wheels $k$, $k^1$, of the controller, their adjacent ends may, as shown for example in Fig. 3, be provided with corresponding interengaging projections 14 and recesses 15 that ensure their being placed in the correct relative positions around the rope. The inter-engaging projections 14 and recesses 15 also serve to keep the several sleeves in line and to preserve, as far as possible, an unbroken wheel track, that is to say, a track in which there is not a straight transverse line of division between the upper portions of adjacent sleeves. The sleeves are held firmly against each other by larger and stronger sleeves 16 (see Fig. 3) that are rigidly and accurately fixed to the end portions of the wire rope or ropes near to the points of suspension of the rope or ropes from the supporting standards therefor at the opposite sides of a river, valley or the like; so that they will effectually resist any tendency of the smaller sleeves to move endways on the rope or ropes under the action of the controller geared thereto. One of the larger sleeves may be made endways adjustable to compensate for any wear of the smaller sleeves that may take place at the joints between them.

In order that the rack teeth shall gear in an efficient manner with the toothed wheels on the controller, they may advantageously be so formed and arranged, as shown in Figs. 4, 5, 6 and 7, that the pitch line of each set thereof corresponds in position, as seen in side view, with the longitudinal axis of the wire ropes 5, $5^a$, or the wire rope 5, so that the relative position of the teeth will not materially be affected when in position for use.

When three ropes are used, as in the example shown in Fig. 9, one, namely, 5, may be arranged centrally above the other two $5^a$, $5^b$, and each sleeve may be composed of an upper portion 6 adapted to extend over the upper rope and down over the sides of the two lower ropes, and a lower portion 7 adapted to fit the underside of the two lower ropes and to be connected to the upper portion of the sleeve in either of the ways hereinbefore described. The upper portion of the sleeve may be provided, at opposite sides thereof, with rows of teeth 8, $8^a$ and with an intermediate flat or convex track portion $8^b$, the pitch lines of the teeth being well below the top of the composite rope. In the case of four ropes, they may be arranged in two superposed pairs, as shown in Fig. 10 with the sleeve 6—7 adapted to surround them and provided with two rows of teeth 8, $8^a$.

Figs. 11 and 12 show a flexible suspension member comprising a flat wire rope 18 formed by several ropes arranged side by side, and sheet metal sleeves 6—7 having racks 8, $8^a$ and an intermediate bearing surface, constructed and applied as hereinbefore described with reference to Figs. 6 and 7.

Flexible supporting means constructed as hereinbefore described so as to constitute what, for brevity, is referred to in the claims as a flexible trackway, although specially advantageous for suspension transporter arrangements of long span, can of course advantageously be used for relatively short spans. Also, they are applicable for use in any case where a flexible gear chain or rack of less weight than a link chain is required for driving or other purposes.

What I claim is:—

1. A flexible trackway comprising a plurality of short metal sections flexibly connected endways and provided with teeth to form a rack, the sections being interlocked in a longitudinal direction so that they cannot move apart endways.

2. A flexible trackway comprising a wire rope and a plurality of short metal sections clamped thereto and provided with longitudinal rows of vertical teeth adapted to form a rack.

3. A flexible trackway comprising a plurality of short metal sections flexibly connected endways and provided with hollow metal teeth to form a rack.

4. A flexible trackway comprising a wire rope, a plurality of short metal sections each made in two parts clamped together at the edges around such rope and one of said parts being provided with a longitudinal row of vertical teeth.

5. A flexible trackway comprising a plurality of upper and lower parts, the lower parts having projections or teeth and engaging the teeth on the upper parts, so that the several parts are interlocked with each in the longitudinal direction.

6. A flexible trackway comprising a wire rope and a plurality of short metal sections fixed thereto and provided on their upper sides with teeth, each section being made in two parts clamped together around said rope, one part having lateral projections bent over and engaging the other part between its teeth.

7. A flexible trackway comprising a wire rope and a plurality of relatively short metal sections fixed to said rope and carrying on their upper sides a plurality of relatively short longitudinal racks, said sections being each made in two parts, one part of each section being interlocked in the longitudinal direction with the opposite part of the adjacent section.

8. A flexible trackway comprising a wire rope and a plurality of relatively short racks fixed thereto, each section being made in two parts, one part being formed with vertical teeth and the other part having its edge portions bent over the edges of the first mentioned part and clamped thereto.

9. A flexible trackway comprising adjacent wire ropes, a plurality of relatively short metal sections fixed to said ropes and a plurality of relatively short toothed racks arranged longitudinally and carried by said metal sections.

10. A flexible trackway comprising two adjacent wire ropes of circular section, a plurality of relatively short double metal sections fixed to said ropes and a plurality of relatively short toothed racks carried by and between said metal sections, each double section and corresponding toothed rack being formed out of one piece of metal.

11. A flexible trackway comprising a wire rope, and a plurality of relatively short metal sections fixed thereto and formed with a centrally arranged longitudinal row of rack teeth and at opposite sides of said row of teeth with plain longitudinal surfaces.

12. A flexible trackway comprising a plurality of short metal sections provided with teeth to form a longitudinal rack, a wire rope to which said metal sections are fixed and metal end sections rigidly fixed to said rope and adapted to prevent longitudinal motion of said short metal sections on said rope.

13. A flexible trackway comprising a wire rope and a plurality of relatively short metal sections fixed thereto and formed with teeth arranged to form a longitudinal rack, said sections being provided at their adjacent ends with corresponding interengaging projections and recesses adapted to keep the several sections in alignment and to preserve an unbroken wheel track.

14. A suspension transporter arrangement of the kind herein referred to wherein the flexible suspension means for carrying the travelling controller comprises a wire rope and a plurality of relatively short metal sections fixed thereto in alignment with one another and provided along their length with teeth adapted to gear with toothed wheels on the controller, substantially as described.

Signed at Sheffield, England, this eighteenth day of April 1922.

ALEXANDER GEORGE MACKENZIE JACK.